United States Patent [19]

Chraplyvy et al.

[11] Patent Number: 5,907,420
[45] Date of Patent: May 25, 1999

[54] SYSTEM AND METHOD FOR MITIGATING CROSS-SATURATION IN OPTICALLY AMPLIFIED NETWORKS

[75] Inventors: Andrew R. Chraplyvy, Matawan; John C. Ellson, Red Bank; George W. Newsome, Freehold; Robert William Tkach, Little Silver; John Lehrer Zyskind, Shrewsbury, all of N.J.

[73] Assignee: Lucent Technologies, Inc., Murray Hill, N.J.

[21] Appl. No.: 08/713,568

[22] Filed: Sep. 13, 1996

[51] Int. Cl.$^6$ .......................... H04B 10/17; H04B 10/18; H04J 14/02
[52] U.S. Cl. .......................... 359/179; 359/124; 359/161
[58] Field of Search .................................. 359/110, 161, 359/174, 176, 177, 179, 124, 125, 134, 135

[56] References Cited

U.S. PATENT DOCUMENTS

| | | | |
|---|---|---|---|
| 5,225,922 | 7/1993 | Chraplyvy et al. | 359/161 |
| 5,311,347 | 5/1994 | Kubo et al. | 359/161 |
| 5,374,973 | 12/1994 | Maxham et al. | 359/177 |
| 5,396,360 | 3/1995 | Majima | 359/161 |
| 5,428,471 | 6/1995 | McDermott | 359/177 |
| 5,438,445 | 8/1995 | Nakano | 359/124 |
| 5,448,660 | 9/1995 | Calvani et al. | 385/21 |
| 5,463,487 | 10/1995 | Epworth | 359/161 |
| 5,479,082 | 12/1995 | Calvani et al. | 359/15 |
| 5,488,500 | 1/1996 | Glance | 359/127 |
| 5,500,756 | 3/1996 | Tsushima et al. | 359/110 |
| 5,510,926 | 4/1996 | Bayart et al. | 359/179 |
| 5,633,741 | 5/1997 | Giles | 359/124 |
| 5,644,423 | 7/1997 | Iwano | 359/177 |
| 5,673,142 | 9/1997 | Fathi et al. | 359/177 |
| 5,675,432 | 10/1997 | Kosaka | 359/177 |
| 5,701,186 | 12/1997 | Huber | 359/125 |

OTHER PUBLICATIONS

Oda et al, An Optical FDM–Add/Drop Myltiplexing Ring Network Utilizing Fiber Fabry–Perot Filters and Optical Circulators, IEEE Photo. Tech. Letters, vol. 5, No. 7, pp. 825–828, Jul. 1993.

L. Quetel et al "Programmable fiber grating based wavelength multiplexer" OFC '96 Technical Digest, WF6, pp. 120–121.

P.A. Perrier et al. "4–channel, 10–Gbit/s capacity self–healing WDM ring network with wavelength add/drop multiplexers". OFC '96 Technical Digest, ThD3, pp. 218–220.

P.E. Green, Jr., "Optical Networking Update", IEEE J. of Selected Areas in Communications. vol. 14, #5, Jun. 1996 pp. 764–779.

N. N. Khrais et al "Effect of cascaded misaligned optical (de) (de) multiplexers on multiwavelength optical network performance" OFC '96 Technical Digest pp. 220–221.

H. Toba et al "An Optical FDM–Based Self–Healing Ring Network Employing Arrayed Waveguide Grating Filters and EDFA's with Level Equalizers", IEEE J. on Selected Areas in Communications, V. 14, #5, Jun., 1996 pp. 800–813.

A. Hamel et al, "Optical filters in WDM Ring Network Architectures" Proc. SPIE, vol. 2449, pp. 70–77 Int. Soc. Opt. Eng. 1995.

J.E. Midwinter, Photonics in Switching vol. II Systems Academic Press, "Quantum Electronics–Principles and Applications" Chap. 3.

*Primary Examiner*—Leslie Pascal

[57] ABSTRACT

A system and method of protecting all the amplifiers in a link between wavelength routing network elements of an optical network. According to the invention, an optical control channel is added before a plurality of optical amplifier, preferably the first amplifier, in a link. To prevent improper loading of downstream links, the control channel is stripped off at the next wavelength routing network element. The power of the control channel is automatically adjusted using a fast feedback circuit to hold substantially constant the total power of the signal channels and the control channel at the input of the first amplifier following the feedback loop. In this manner, channel loading of all optical amplifiers in the link is maintained substantially constant, and the incidence of error bursts, as might otherwise result when one or more channels are added or dropped due to a network fault or reconfiguration, is substantially reduced.

25 Claims, 3 Drawing Sheets

- ○ 7 CH
- ▽ 7 CH, 5 CH MOD, NO CONTROL
- □ 7 CH, 5 CH MOD, CONTROL ON
- ● 6 CH, CW
- ■ 6 CH, 5 CH MOD, NO CONTROL
- △ 6 CH, 5 CH MOD, CONTROL ON

SYSTEM AND METHOD FOR MITIGATING CROSS-SATURATION IN OPTICALLY AMPLIFIED NETWORKS

BACKGROUND OF THE INVENTION

1. Field of the Invention

The present invention relates generally to optical fiber communication networks and, more particularly, to systems and methods for dynamically controlling gain in accordance with the collective behavior of the amplifier chains employed in the links of such networks.

2. Description of the Background Art

A dramatic increase in the information capacity of an optical fiber can be achieved by the simultaneous transmission of optical signals over the same fiber from many different light sources having properly spaced peak emission wavelengths. By operating each light source at a different peak wavelength, the integrity of the independent messages from each source is maintained for subsequent conversion to electric signals at the receiving end. This is the basis of wavelength division multiplexing (WDM).

Wavelength switched optical networks potentially offer high capacity networking at lower cost than current electronically switched networks. The optical amplifiers in the nodes and repeaters of such networks will each be traversed by multiple signal channels following diverse routes. In optical amplifiers such as rare-earth doped fiber amplifiers (e.g., erbium doped fiber amplifiers—EDFA's), amplified spontaneous emission (ASE) is the major source of noise. ASE originates from the spontaneous emission of incoherent light over the broad gain bandwidth of the amplifier and constitutes the random noise contribution of the amplifier. If the signal powers in the transmission fibers are too high, optical nonlinearities such as Stimulated Brillouin Scattering (SBS) can also occur and further degrade the signals by introducing noise. In the wavelength domain, gain saturation induced by a data channel operating at $\lambda_1$ produces a level change in another data channel at wavelength $\lambda_2$.

In optically amplified systems, the above-described noise sources present two limitations on the amplifier operating range. At low input signal levels the amplifier random noise contribution, ASE, causes bit errors (signal-spontaneous beat noise) while at large input signal levels, nonlinearities in the transmission fiber add noise and can also degrade performance. As such, fluctuations in the transmitted data stream—as may occur, for example, when one or more wavelength channels are added or dropped—can have a substantial effect on the reliability and quality of service in a multiwavelength network. Illustratively, the number of channels traversing an EDFA may change suddenly as a result of a network reconfiguration or a fault that interrupts some of the channels. Cross saturation in the affected optical amplifiers of a network will induce power transients in the surviving channels, the speed of which is proportional to the number of amplifiers in the network; for large networks, surviving channel power transients can be large and extremely fast. If their power levels exceed thresholds for optical nonlinearities or become too low to preserve adequate eye opening, the surviving channels traversing the optical amplifier will suffer error bursts.

The gain medium in a rare-earth doped optical fiber amplifier such, for example, as an EDFA has a comparatively long excited state lifetime or relaxation time, and for this reason is generally regarded as allowing for a larger saturation energy and, hence, as exhibiting virtually no saturation in response to high speed data pulses (1 ns). In fact, it has been reported that transient effects of gain saturation and recovery in an individual amplifier typically occur on a 100 µsec–1 msec time scale. [Desurvire et al., Erbium Doped Fiber Amplifiers, p. 412 (1994)]. The inventors herein, have, however, observed gain dynamics in a chain of EDFA's almost two orders of magnitude faster than this and, for large scale wavelength routed networks, gain dynamics three orders of magnitude may be predicted. These fast transients in chains of amplifiers may ultimately constrain the design or extent of multiwavelength optical networks. Accordingly, there is recognized a need for a technique by which the amplifiers employed in optical networks can be reliably controlled despite power level fluctuations in the respective wavelength channels or, in the case of time division multiplexed networks, individual time slots.

SUMMARY OF THE INVENTION

The aforementioned need is addressed, and an advance is made in the art, by a system and method of protecting, on a link-by-link basis, the surviving channels in a link between wavelength routing network elements (NE's). According to the invention, an optical control channel is added before a plurality of optical amplifiers in a link. To prevent improper loading of downstream links, the control channel is stripped off at the next wavelength routing network element. The power of the control channel is automatically adjusted using a fast feedback circuit to hold substantially constant the total power of the signal channels and the control channel at the input of the first amplifier. In this manner, channel loading of all optical amplifiers in the link is maintained substantially constant, and the incidence of error bursts, as might otherwise result when one or more channels are added or dropped due to a network fault or reconfiguration, is substantially reduced.

BRIEF DESCRIPTION OF THE DRAWINGS

The above features and advantages of the present invention will become apparent from the ensuing description of several preferred exemplary embodiments, which should be read in conjunction with the accompanying drawings, in which.

DETAILED DESCRIPTION OF THE INVENTION

Figure 1:
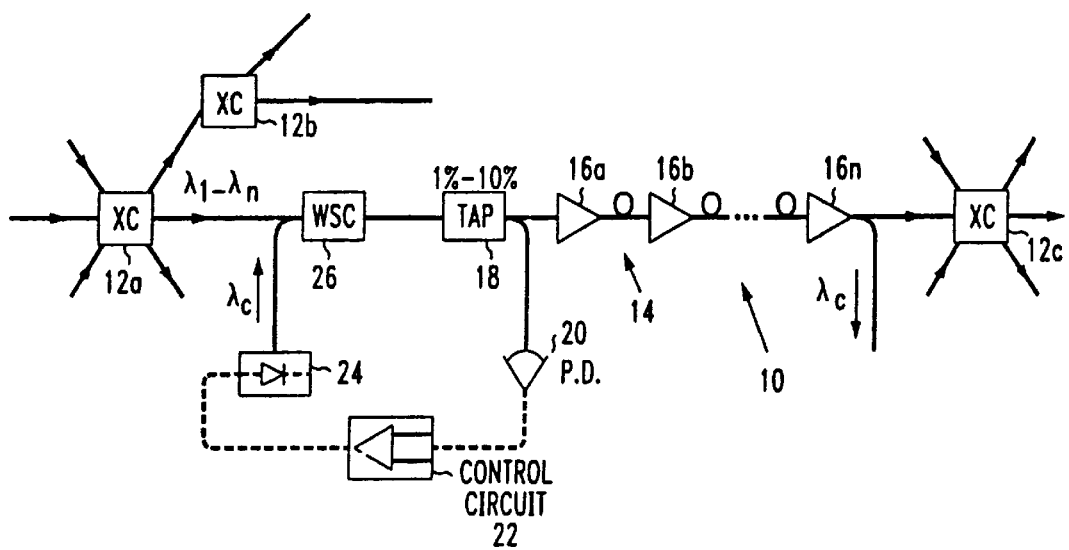
FIG. 1 is a block diagram depicting a portion of an illustrative optical network employing chains of optical amplifiers and link control in accordance with the present invention.

An illustrative, large-scale optical communications network 10 is shown in FIG. 1. Initially, it should be noted that although a wavelength division multiplexed (WDM) network is shown and described in detail, such description is by way of illustrative example only. It should, in fact, be readily appreciated by those skilled in the art from the discussion which follows that the teachings of the present invention are equally applicable to other multiplexed optical networks such, for example, as time division multiplexed (TDM) networks.

In any event, and as seen in FIG. 1, wavelength division multiplexed data is transmitted on multiple wavelengths or channels between a plurality of network routing elements—illustratively, cross-connect switches (XC)—that are distributed throughout the network 10 and interconnected by optical fiber links. Although an optical communications network such as network 10 may, in fact, include hundreds of such network routing elements, only three such switches—indicated generally at 12a, 12b, and 12c—are shown for purposes of clarity and ease of illustration.

With continued reference to FIG. 1, it will be observed that the optical fiber links between a pair of network elements, as for example, link 14 that interconnects cross-connect switches 12a and 12c, typically includes many optical amplifiers—these being indicated generally at 16a through 16n. The type and spacing of the optical amplifiers employed along the link will, of course, depend upon the wavelength band to be utilized for transmission. A typical wavelength band of interest in telecommunications applications, for example, is centered at 1550 nm. The gain profile of a rare-earth doped fiber amplifier (EDFA) is generally regarded as being best suited for this wavelength, with a typical inter-amplifier spacing of 40 km being considered suitable for an optical fiber link such as link 14.

Essentially, the present invention is based on the recognition by the inventors herein that the gain dynamics in a chain of optical amplifiers such, for example, as the erbium doped fiber amplifiers (EDFA's) deployed in link 14 of network 10, may be up to several orders of magnitude faster than those reported for a single amplifier. According to the present invention, a technique for maintaining constant input power to all of the amplifiers in a link is utilized to ensure continued reliable service, in the surviving channels being transmitted along the link, when one or more wavelength channels are suddenly dropped or added, as may be experienced when a system reconfiguration or fault occurs.

In the illustrative embodiment of the invention depicted in FIG. 1, link control according to the present invention is implemented by a feedback arrangement that includes a power tap 18, a photodetector 20, a control circuit 22 that responds to fluctuations in the transmitted power level detected by the photodetector 20 by adjusting an output error signal which, in turn, controls the output power level of optical source 24—illustratively a semiconductor laser—which outputs a control signal at a wavelength $\lambda_c$ that is within the gain band of the optical amplifier. The thus generated control channel $\lambda_c$ is then introduced back into the link as, for example, by a wavelength selective coupler 26. As will be readily appreciated by those skilled in the art, by controlling the power level of the control channel, it is possible to maintain the power level of the optical signal supplied to some or all of the optical amplifiers in a given link (depending, of course, upon where the control channel is introduced). In the illustrative embodiment of FIG. 1, the feedback control circuit is implemented before the first amplifier (amplifier 16a) so that the optical power input to all of the optical amplifiers is maintained at a substantially constant level.

Preferably, the control channel is stripped off at the next wavelength routing NE to prevent improper loading of downstream links. This is easily achieved either by addition of another filter or as a byproduct of the filtering action of the demultiplexers commonly located in NEs. Advantageously, the amplifiers between wavelength routing NE's require no special control circuitry or modification since control is handled on a link-by-link basis.

Figure 2:
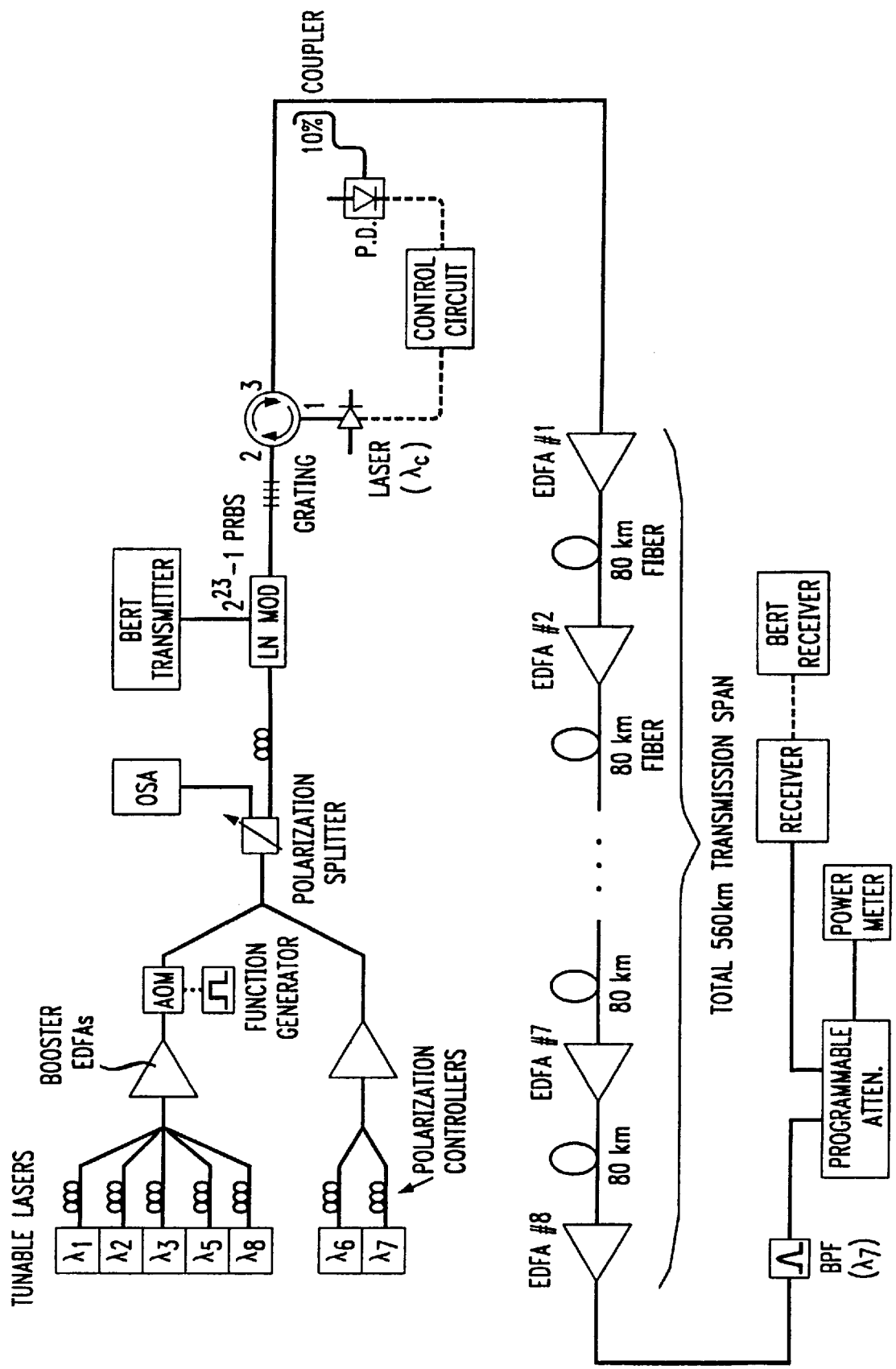
FIG. 2 is a block diagram of an investigative apparatus utilized to evaluate the effectiveness of link control in accordance with the present invention.

An experimental setup for the demonstration of link control surviving channel power protection is illustrated in FIG. 2. The outputs of seven tunable lasers tuned to MONET channel wavelengths as shown were combined, five through a fused fiber coupler and the other two through a second coupler, and each group was amplified. The output of the five lasers was passed through an acousto-optic modulator to simulate the loss and addition of these channels and then combined with the other pair in a 2×2 coupler. The channels were then modulated at 2.5 Gb/s.

Figure 3:
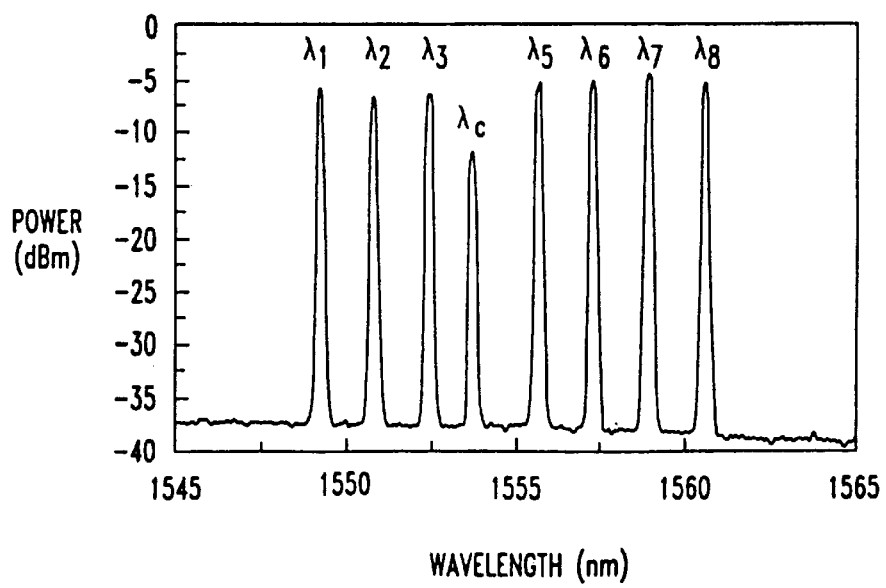
FIG. 3 is a graphical representation of the wavelength channel spectrum obtained at the link control power tap in the investigative apparatus of FIG. 2.

The link control channel ($\lambda_c$=1554 nm) was then added before the first amplifier in the link using a circulator and Bragg grating. A spectrum showing the signal channels and control channel when all channels are present is shown in FIG. 3. In an actual system, the grating Bragg wavelength should be chosen close to, but outside of, the band of signal channels so as to permit use of the full complement of signal channels. A portion of the total power of the signal channels and the control channels was tapped off and detected. A fast feedback circuit was used to adjust the line control channel's power to maintain the total power constant. The signal channels and control channel were then transmitted through seven amplified spans of standard single mode fiber with a total length of 570 km and passed through a bandpass filter to select channel 7, the bit error rate of which was monitored.

Figure 4:
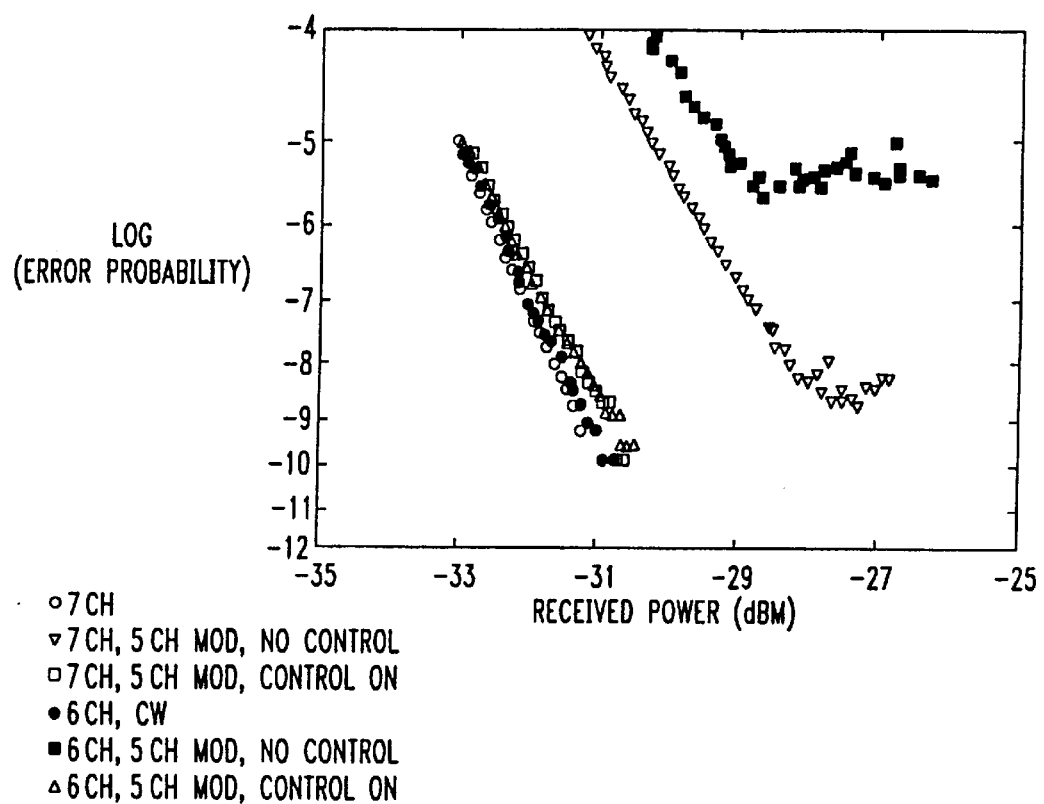
FIG. 4 is a graphical representation comparing the bit error rates obtained with and without link control in accordance with the present invention while six or seven multiple wavelength channels were transmitted over the 560 km transmission span employed in the investigative apparatus of FIG. 2.
Figure 5:
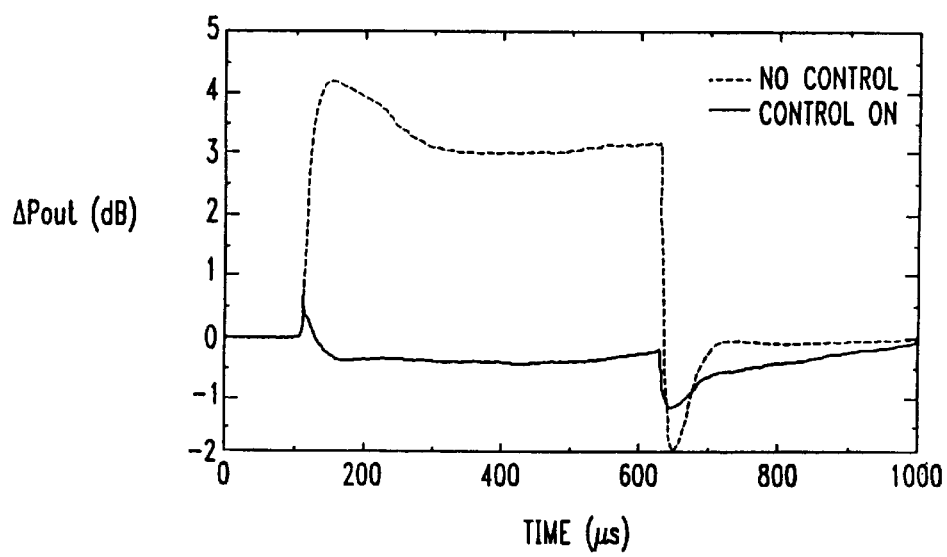
FIG. 5 is a graphical representation comparing the power excursions observed in a surviving wavelength channel, with and without the control channel operating to maintain constant power over the test transmission span.

Measurements were carried out in which all seven signal channels were transmitted and in which channels 1, 2, 3, 5, 7 and 8 were transmitted. When channels 1, 2, 3, 5 and 8 were modulated on and off with a frequency of 1 KHz (FIG. 4) surviving channel 7 suffers a penalty exceeding 2 dB for seven channel transmission (two surviving channels) and 3 dB for six channel transmission (one surviving channel) due to the induced cross saturation. Finally, measurements were carried out with the control channel operating to maintain constant power through the link. The results of these measurements are shown in FIG. 5. Without control, channel 7 suffers large power excursions which degrade the BER performance due to optical nonlinearities in the transmission fiber. With fast link control according to the present invention in operation, on the other hand, the power excursions are mitigated. The feedback circuit utilized in the investigational apparatus of FIG. 2 limits the power increase after 4 μs; a faster circuit would limit the power excursions even more effectively. Even with the present control circuit, Channel 7 is successfully protected (see FIG. 4); penalties are reduced to a few tenths of a dB and the error floors disappear.

As will be readily ascertained by those skilled in the art, the link control technique of the present invention is fast; changes in channel loading result in prompt changes in a link's total power—permitting much faster detection and response than schemes which rely on detecting the much slower changes in channel output power, gain or ASE in individual EDFA's (which are much slower than the transients in EDFA networks). Performing corrections on a per link basis rather than a per amplifier basis simplifies the required hardware, does not increase the complexity of the network's EDFA's and is well suited to the architecture of wavelength routed networks.

An additional benefit of link control according to the present invention is the cancellation of modulation of the total power arising from the information content of the signal channels. The faster transient response of long chains of amplifiers will result in cross talk due to cross saturation in the amplifier chains up to much higher frequencies than would occur for single amplifiers, as high as 10 MHz for large networks. The link control channel eliminates this crosstalk by eliminating modulation in the total power for the range of frequencies at which cross saturation will occur. Other advantages include detection of changes in channel loading, speed limited only by feedback circuit, simpler implementation requiring less hardware, less management and no changes to the amplifiers and cancellation of low frequency channel power variations.

From the foregoing, it should be readily ascertained by those skilled in the art that the invention is not limited by the embodiments described above which are presented herein as examples only but may, in fact, be modified in various ways within the scope of protection as defined by the appended patent claims.

What is claimed is:

1. A method of operating an optical communication network including at least one optical communication path having at least one input terminal and at least one output terminal and a plurality of optical amplifiers along the at least one optical communication path, comprising:

transmitting multiplexed optical signal channels along a communication path of the network;

introducing an optical compensating channel into the at least one communication path, said optical compensating channel being at a wavelength in the gain band of the optical amplifiers;

adjusting the power level of the optical compensating channel using an optical amplifier of the plurality of optical amplifiers in response to a change in the power of at least one of the signal channels; and removing the optical compensating channel at a next optical amplifier along the communication path to prevent improper loading downstream of the adjusting optical amplifier.

2. The method of claim 1, wherein the optical compensating channel passes through at least one optical amplifier in the communication path.

3. The method of claim 1, wherein at least some of the optical amplifiers are rare-earth doped optical fiber amplifiers.

4. The method of claim 1, wherein said adjusting step is performed within 100 μsec of a change in signal channel power.

5. The method of claim 1, wherein said adjusting step includes monitoring the total signal power level in all of the optical signal channels.

6. The method of claim 1, wherein wavelength division multiplexed signals are transmitted during said transmitting step.

7. The method of claim 1, wherein time-division multiplexed signals are transmitted during said transmitting step.

8. The method of claim 1, further including a step of selectively routing at least one of the optical signal channels from a first channel routing element to a second channel routing element to thereby establish the communication path between an input terminal and an output terminal of the optical communication network.

9. The method of claim 8, further including a step of selectively routing at least one of the optical signal channels from said second channel routing element to a third channel routing element.

10. The method of claim 1, further including a step of selectively routing, using at least one channel routing element, at least one of the optical signal channels to thereby establish the communication path between an input terminal and an output terminal of the optical communication network.

11. The method of claim 10, wherein the channel routing element is selected from the group consisting of fixed or reconfigurable wavelength-selective crossconnects, fixed or reconfigurable wavelength-add/drop multiplexers, fixed or reconfigurable wavelength routers, and fixed or reconfigurable wavelength-interchanging crossconnects.

12. The method of claim 1, wherein the adjusting step is performed when one or more optical signal channels are added or dropped as a result of network reconfigurations or faults.

13. An optical communication network including at least one optical communication path having at least one input terminal and at least one output terminal and a plurality of optical amplifiers along the at least one optical communication path, comprising:

means for transmitting multiplexed optical signal channels along a communication path of the network;

means for introducing an optical compensating channel into the at least one communication path, said optical compensating channel being at a wavelength in the gain band of the optical amplifiers;

means for adjusting the power level of the optical compensating channel using an optical amplifier of the plurality of optical amplifiers in response to a change in the power of at least one of the signal channels; and means for removing the optical compensating channel at a next optical amplifier along the communication path to prevent improper loading downstream of the adjusting optical amplifier.

14. The network of claim 13, wherein the optical compensating channel passes through at least one optical amplifier in the communication path.

15. The network of claim 13, wherein at least some of the optical amplifiers are rare-earth doped optical fiber amplifiers.

16. The network of claim 13, wherein said means for adjusting is operable to adjust the power level of the optical control channel within 100 μsec of a change in signal channel power.

17. The network of claim 13, wherein said means for adjusting is operable to monitor the total signal power level in all of the optical signal channels.

18. The network of claim 13, wherein said means for transmitting is operable to direct wavelength division multiplexed signals over the optical communication path.

19. The network of claim 13, wherein said means for transmitting is operable to direct time-division multiplexed signals over the optical communication path.

20. The network of claim 13, further including a first channel routing element and a second channel routing element, said first channel routing element being operable to route at least one of the optical signal channels to a second channel routing element to thereby establish the communication path between an input terminal and an output terminal of the optical communication network.

21. The network of claim 20, wherein the second channel routing element is operable to selectively route at least one of the optical signal channels to a third channel routing element.

22. The network of claim 13, further including at least one channel routing element for routing at least one of the optical signal channels to thereby establish the communication path between an input terminal and an output terminal of the optical communication network.

23. The network of claim 22, wherein the channel routing element is selected from the group consisting of fixed or reconfigurable wavelength-selective crossconnects, fixed or reconfigurable wavelength-add/drop multiplexers, fixed or reconfigurable wavelength routers, and fixed or reconfigurable wavelength-interchanging crossconnects.

24. An apparatus for controlling a plurality of optical amplifiers disposed along an optical communication path, comprising:

means for transmitting multiplexed optical signal channels along a communication path of the network;

means for introducing an optical compensating channel into the at least one communication path, said optical compensating channel being at a wavelength in the gain band of the optical amplifiers; and means for adjusting the power level of the optical compensating channel using an optical amplifier of the plurality of optical amplifiers in response to a change in the power of at least one of the signal channels; and removing the optical compensating channel at a next optical amplifier along the communication path to prevent improper loading downstream of the adjusting optical amplifier.

25. The apparatus of claim 24, further including a channel routing element selected from the group consisting of fixed or reconfigurable wavelength-selective crossconnects, fixed or reconfigurable wavelength-add/drop multiplexers, fixed or reconfigurable wavelength routers, and fixed or reconfigurable wavelength-interchanging crossconnects.

* * * * *

UNITED STATES PATENT AND TRADEMARK OFFICE
CERTIFICATE OF CORRECTION

PATENT NO. : 5,907,420
DATED : May 25, 1999
INVENTOR(S) : Andrew R. Chraplyvy, John C. Ellson, George W. Newsome, Robert William Tkach, John Lehrer Zyskind It is certified that error appears in the above-identified patent and that said Letters Patent is hereby corrected as shown below:

Column 1,
Line 3, after the Title insert
-- ACKNOWLEDGEMENT OF GOVERNMENTAL RIGHTS This invention was made with Government support under Agreement No. MDA 972-94-3-0036 awarded by ARPA. The Government has certain rights in the invention. --

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*